INVENTORS
J. H. AUER, JR., J. P. HUFFMAN,
AND R. P. VAN WORMER
BY
*Forest B. Hitchcock*
THEIR ATTORNEY Dec. 2, 1969   J. H. AUER, JR., ET AL   3,482,208
TRAFFIC SIGNAL CONTROL SYSTEM
Filed Feb. 21, 1966                         9 Sheets-Sheet 2

(+) = 1 = SPACE
(−) = 0 = MARK

| INTERVAL | COMPUTER CODE | | | | STANDBY CODE | | | | INTERVAL NO. |
|---|---|---|---|---|---|---|---|---|---|
| | 1 | 2 | 4 | 8 | 1 | 2 | 4 | 8 | |
| ALL RED | 1 | 1 | 1 | 1 | 1 | 1 | 1 | 1 | 0 |
| ∅1, ∅2, ∅3, WALK | 0 | 1 | 1 | 1 | 0 | 1 | 1 | 1 | 1 |
| ∅1,∅2,∅3,F1,DON'T WALK | 1 | 0 | 1 | 1 | 1 | 0 | 1 | 1 | 2 |
| ∅1 GREEN | 0 | 0 | 1 | 1 | 0 | 0 | 1 | 1 | 3 |
| ∅1 YELLOW | 1 | 1 | 0 | 1 | 1 | 1 | 0 | 1 | 4 |
| ALL RED | 1 | 1 | 1 | 1 | − | − | − | − | 0 |
| ∅2 GREEN | 0 | 1 | 0 | 1 | 0 | 1 | 0 | 1 | 5 |
| ∅2 YELLOW | 1 | 0 | 0 | 1 | 1 | 0 | 0 | 1 | 6 |
| ALL RED | 1 | 1 | 1 | 1 | − | − | − | − | 0 |
| ∅3 GREEN | 0 | 0 | 0 | 1 | 0 | 0 | 0 | 1 | 7 |
| ∅3 YELLOW | 1 | 1 | 1 | 0 | 1 | 1 | 1 | 0 | 8 |

*INVENTORS*
J. H. AUER, JR., J. P. HUFFMAN,
AND R. P. VAN WORMER
BY
*Forest S. Hitchcock*
THEIR ATTORNEY

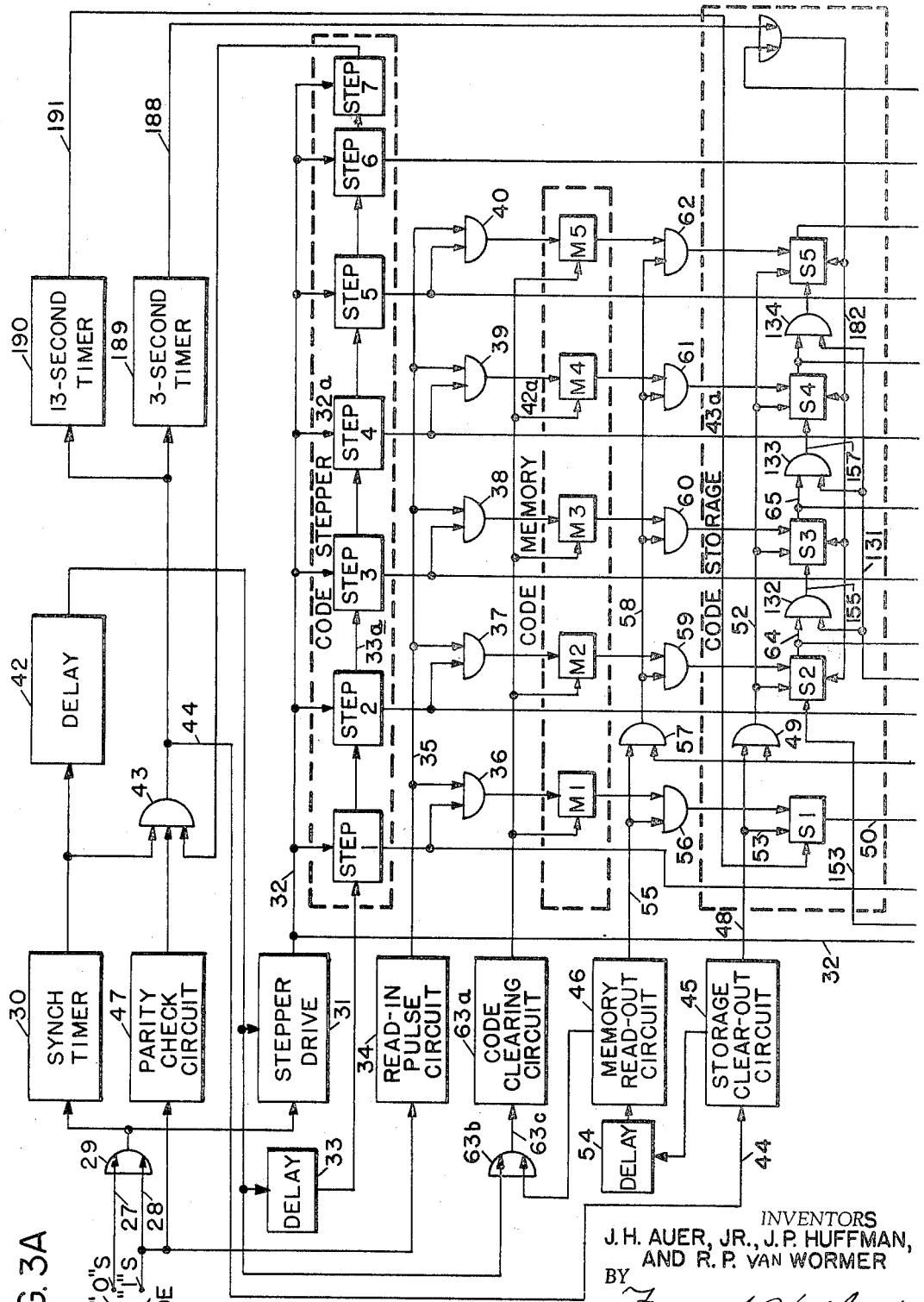

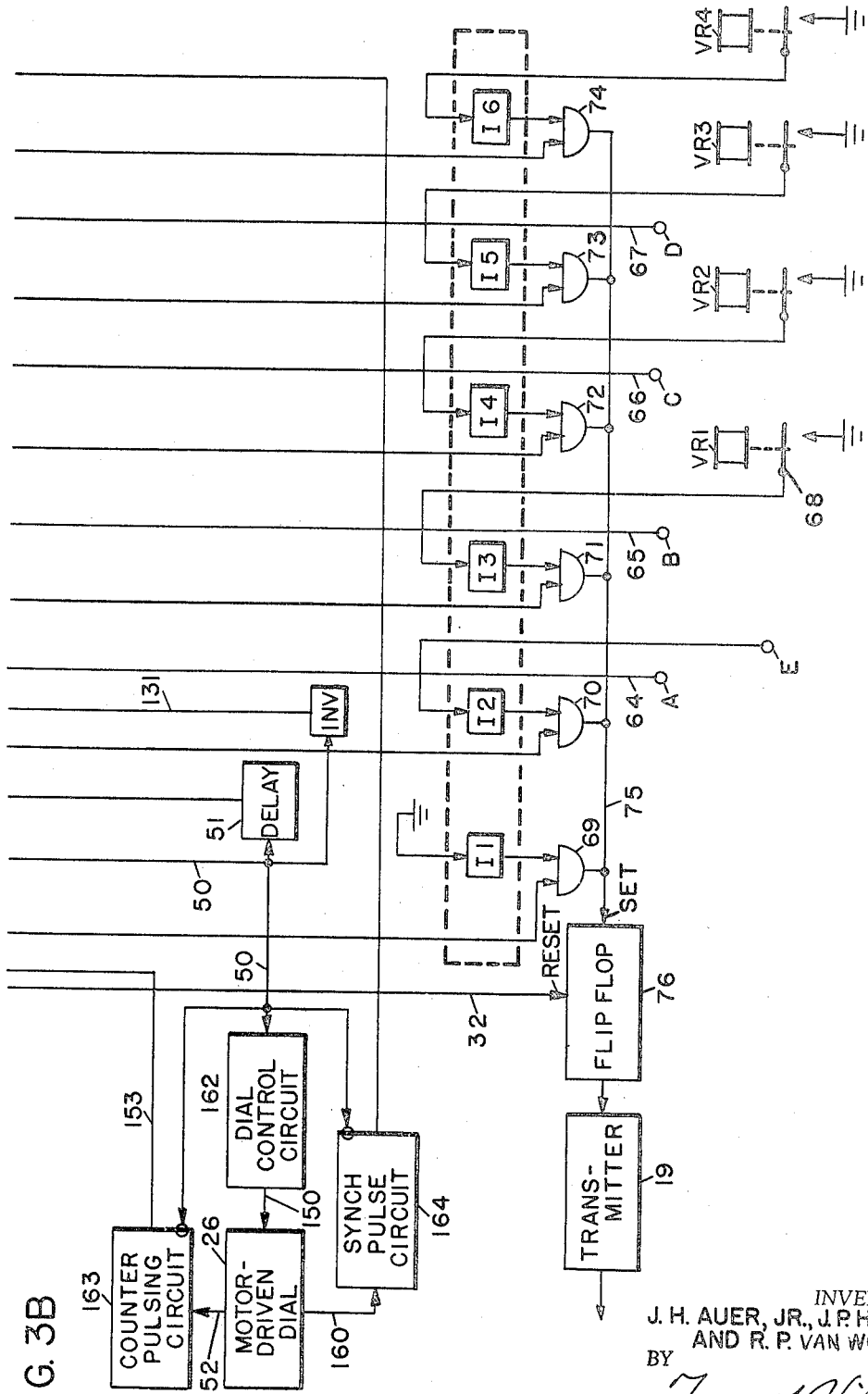

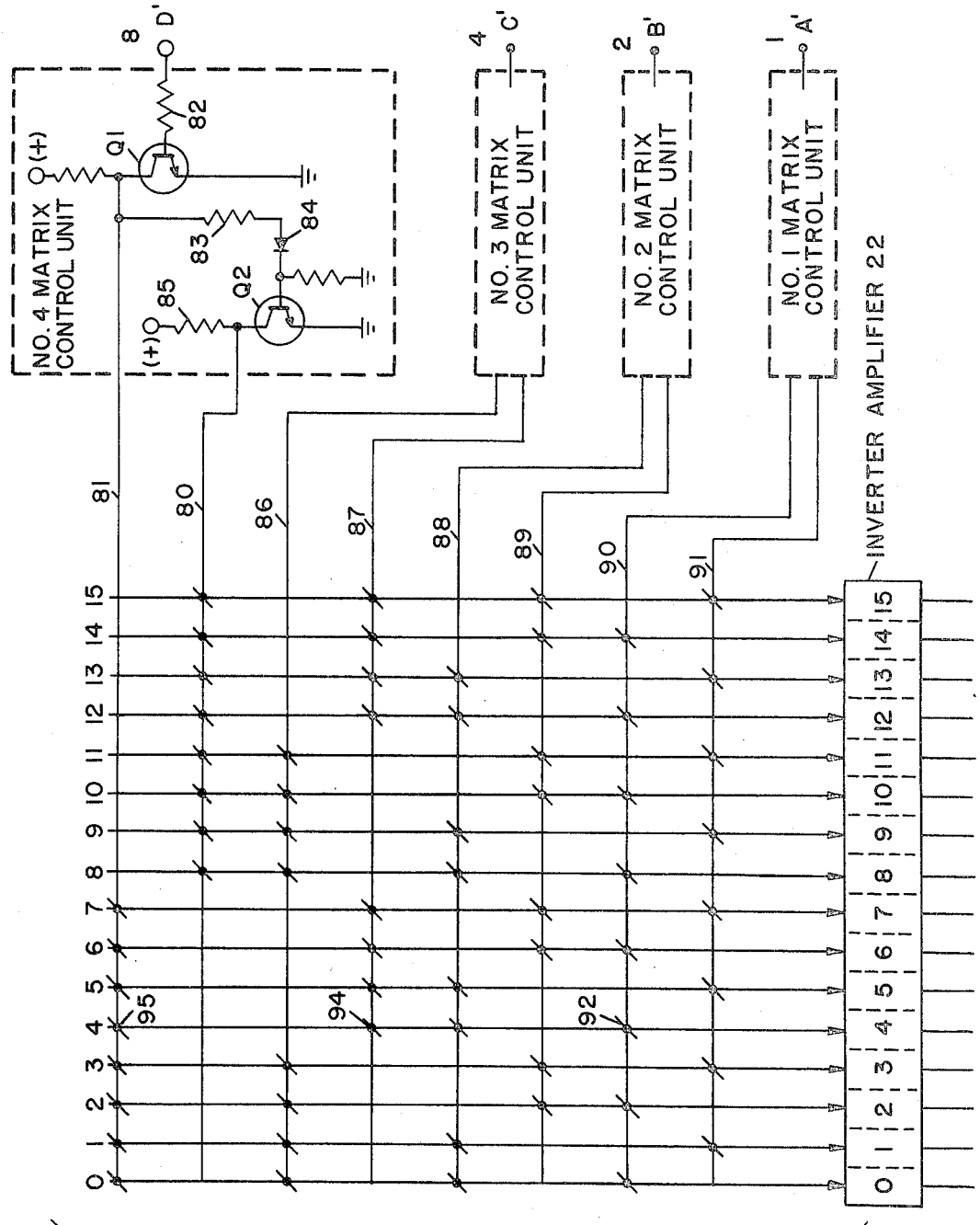

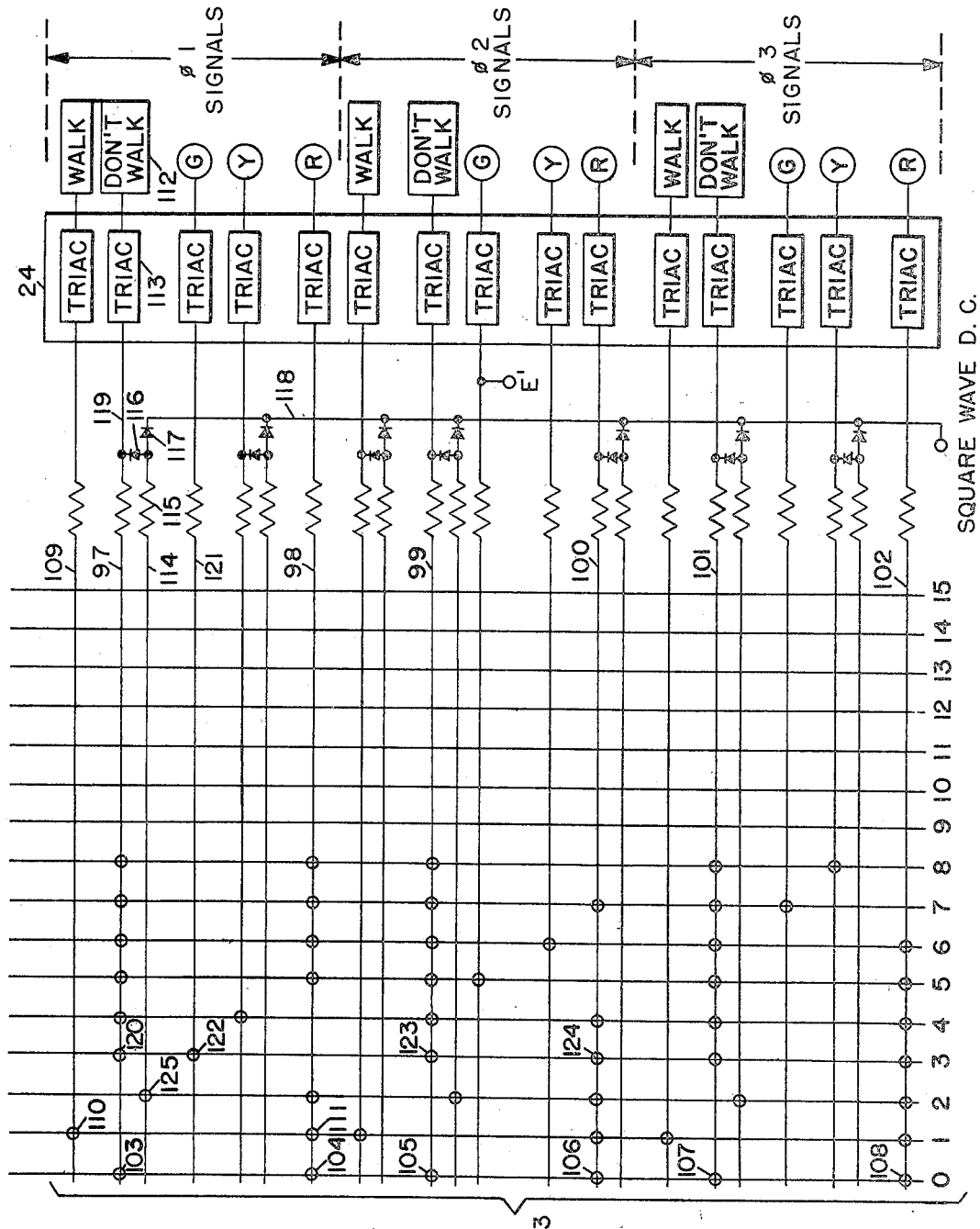
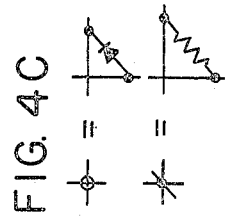
FIG. 4B
FIG. 4C
INVENTORS
J. H. AUER, JR., J. P. HUFFMAN,
AND R. P. VAN WORMER
BY
THEIR ATTORNEY INVENTORS
J. H. Auer, Jr.
J. P. Huffman
R. P. Van Wormer BY Forest B. Hitchcock

THEIR ATTORNEY

Dec. 2, 1969         J. H. AUER, JR., ET AL         3,482,208
                  TRAFFIC SIGNAL CONTROL SYSTEM
Filed Feb. 21, 1966                        9 Sheets-Sheet 8

INVENTORS
J.H. AUER, JR., J.P. HUFFMAN,
AND R.P. VAN WORMER
BY
*Forest B. Hitchcock*
THEIR ATTORNEY

INVENTORS
J. H. AUER, JR., J. P. HUFFMAN,
AND R. P. VAN WORMER
BY
THEIR ATTORNEY 3,482,208
TRAFFIC SIGNAL CONTROL SYSTEM
John H. Auer, Jr., Fairport, and Jerry P. Huffman and Roger P. Van Wormer, Rochester, N.Y., assignors to General Signal Corporation, Rochester, N.Y., a corporation of New York
Filed Feb. 21, 1966, Ser. No. 529,156
Int. Cl. G08g 1/00; H04q 11/00
U.S. Cl. 340—35           7 Claims This invention relates to a system for the control of traffic signals, and more particularly pertains to such a system in which a coded message is transmitted periodically from a master controller to each signal controller in the system to control said controller to display a particular combination of signal indications throughout a predetermined time until a further, updated message is received. The same coded message is transmitted repeatedly to any signal controller as long as the same combination of signal indications is to be displayed, but a different message is transmitted to effect the display of a different combination of signal indications.

In the past, signal controllers have generally comprised mechanical devices having an electrically driven clock element or "dial" which, at periodic intervals, advances a cam switching unit from one step to the next, with the cam unit on each step controlling the energization of a different combination of traffic signal lamps. Although quite commonly such controllers operate independently of each other, each demarcating successive intervals according to a pretimed pattern, it is also common practice to coordinate the various controllers into an overall system to facilitate control of the operation of the various signal controllers of a system from a central location.

In a coordinated system, different control programs may be instituted at different times of day to cope with varying traffic conditions or, as is commonly done, the control system may be made responsive to traffic indications sensed by vehicle detectors at various locations throughout the system. In the latter case, information regarding traffic congestion is constantly transmitted to the master controller which then institutes any of various different signal programs dependent upon the traffic conditions being encountered at any given time. For example, cycle length may readily be varied in response to the amount of traffic experienced. It is also common practice to vary the offset applied to successive controllers along an artery to thereby time the progression of signal changes so that a vehicle traveling in a preferred direction and at a predetermined speed will ordinarily encounter successive GREEN signal indications. Frequently, the master controller is also capable of exercising supervision over the cycle split at various controller locations, thereby selectively favoring one of several conflicting rights-of-way at an intersection over another in accordance with relative traffic levels on such conflicting rights-of-way.

In the prior copending application of John H. Auer, Jr., Ser. No. 239,714, filed Nov. 22, 1962, and assigned to the assignee of the present application, there is disclosed a system for the coordinated control of a plurality of traffic signal controllers by means of a digital communication system. In that prior patent application, repetitive cycles, each comprising a predetermined number of discrete code pulses, are transmitted from a master controller to each intersection controller. Each such controller comprises counting apparatus which counts the discrete code pulses. Upon reaching various preselected counts, each individually adjustable for each controller, the counter controls the associated traffic signals to display a different combination of signal indications. Controlling the rate of pulse transmission at the master controller makes it possible to control cycle length. It is also possible in such a system to send a message to each controller to cause the controller to select one of a predetermined number of preadjusted offsets and also one of a predetermined number of available cycle splits. Each intersection controller demarcates successive signal cycles which can selectively assume a variety of different phase relationship relative to a background cycle demarcated for the system by the master controller. Selection of a particular phase relationship occurs in response to the offset message, and in this way it is possible for the successive local controllers to operate with any one of predetermined number of offsets.

Although the system of the aforesaid application Ser. No. 239,714 does therefore operate in response to a digital code, it is obvious from the brief description given thus far of such a system that each intersection controller can operate only according to a prescribed program established for that controller. The principal function of the master controller in such system is to provide repetitive driving pulses for each intersection controller to operate the counting means at each such controller through successive cycles of operation, and additional functions of the master controller are to transmit offset and cycle split data to each controller in the system. Not only does this require relatively complex apparatus at each controller location, but there is also limited flexibility available in the system since each controller must necessarily be preprogrammed to operate through a predetermined succession of different intervals on each of which a prescribed combination of signal lamps is illuminated. Moreover, it will be apparent to one skilled in the art that where an individual controller is to operate as a multiphase controller, in the vehicle-actuated mode, additional complexities in equipment are required for the controller to operate selectively from one phase to another in other than the predetermined sequence. For example, in a controller adapted to provide signal control for three or more phases, some or all of which are vehicle-actuated, it becomes necessary to supply additional, complex equipment in order to operate from one phase to any other designated phase on which a vehicle or pedestrian call has been received while, at the same time, skipping some other phase on which no call has been received.

To overcome these drawbacks of the prior art systems, we have developed the system of this invention which makes use of the unusual data handling and computing functions which are offered by present day digital computers. Thus, rather than providing what is, in effect, a small special purpose computer for each individual controller location, the present invention instead provides that all the data handling and computing functions will be carried out at the master controller location, with the master controller then providing periodically a coded message for each individual controller to designate the particular signal interval (combination of signal indications) which should be assumed by that controller for the predetermined, successive interval. At the end of that next interval, a following message is transmitted to each controller which may be the same as the message last transmitted or may be different for some or all of the controllers with the result that, on each successive interval, any signal controller may be operated to any one of a plurality of different conditions, in each of which a different combination of signal lamps is energized.

Because any code message may be transmitted to any controller on any of the successive intervals, without the necessity of transmitting the successive messages in a predetermined order or sequence, it becomes possible for any controller to operate from any one designated interval to any other without having to operate through any intermediate intervals. Also, since the principal function of the controller is then reduced to that of decoding a coded digital message received from the master controller, and selectively controlling the display of signal lamps in accordance with the received message, it becomes possible to provide a complete coordinated system in which each intersection controller is relatively simple in construction and therefore of relatively low cost and with little requirement for maintenance.

The present invention, described briefly, therefore comprises a system for the control of a number of intersection controllers from a master controller location, with the master controller comprising digital computer apparatus connected via communication circuits to each local controller. Over the communication circuits, data is provided to the computer at the master controller which is representative of traffic conditions at selected detector locations throughout the system. In response to this traffic data, the computer, at regular periodic intervals, produces for each individual controller in the system a coded message which is intended only for that controller, with such message, in effect, designating the particular interval to which the corresponding controller is to be operated upon receiving the message. The successive coded messages may be prepared by the master controller computer at one second intervals, for example, so that, in effect, the computer informs each controller once each second as to the particular combination of signal lamps that is to be displayed for the succeeding one second interval or until a further coded message is received. Storage means at the local controller retains the latest received code from the master controller and control means responsive to the reception of a complete message removes the stored message from the storage means and substitutes the latest received message.

The system also provides for the transmission of vehicle traffic data over the same communication circuits from the various controllers to the master controller. In addition, the system includes apparatus for standby operation at each controller comprising a mechanically operated dial which is automatically set into operation at any controller location when there is a failure to receive a bona fide interval code from the master controller, and the dial operates, in effect, to supply successive different coded messages to the apparatus at the controller at predetermined intervals corresponding to the desired time of change of signal indications, and these messages take the place of the repetitive code messages which are ordinarily received from the master controller.

It is accordingly an object of this invention to provide a control system for vehicle traffic signals in which a digital computer receives vehicle traffic information from a plurality of vehicle detectors, and periodically formulates a code message for each controller in the system designating the particular interval in the signal cycle that the controller is then to assume for a perdetermined interval and until a new periodic code message is received from the master controller.

It is another object of this invention to provide a digital code system for a plurality of a vehicle traffic control system in which a master controller transmits to each controller at periodic intervals a coded message representative of the particular interval in the code signal cycle then to be effective, with successive code messages being transmitted at a rate such that at least a plurality of such messages is transmitted even during the shortest expected interval.

It is a further object of the invention to provide a control system for a plurality of traffic signal controllers in which a multidigit binary code is transmitted from a master controller to each intersection controller at repetitive intervals, and with each intersection controller comprising apparatus for selecting in response to each received massage a selected cycle interval in accordance with the particular binary code received.

It is another object of the invention to provide a digital control system for a plurality of traffic signal controllers in which each controller comprises a multidigit code storage register and a standby, mechanically operated dial, with the dial becoming effective upon prescribed conditions to operate said register as the binary counter, which binary counter selects a different signal cycle interval for each of a plurality of different binary codes or counts registered thereby.

Other objects, purposes, and characteristic features of the present invention will in part be obvious in the drawings and in part will be pointed out as the description of the invention progresses.

In describing the construction and mode of operation of this invention, reference will be made to the accompanying drawings in which like reference characters designate corresponding parts in the several views and in which:

FIGS. 3A and 3B are a block diagram of the multiplex converter of the present invention;

FIGS. 4A and 4B are a circuit diagram of the decoding apparatus of the present invention;

FIG. 4C illustrates the meaning of the schematic symbols shown in FIGS. 4A and 4B;

GENERAL DESCRIPTION, FIG. 1

Figure 1:
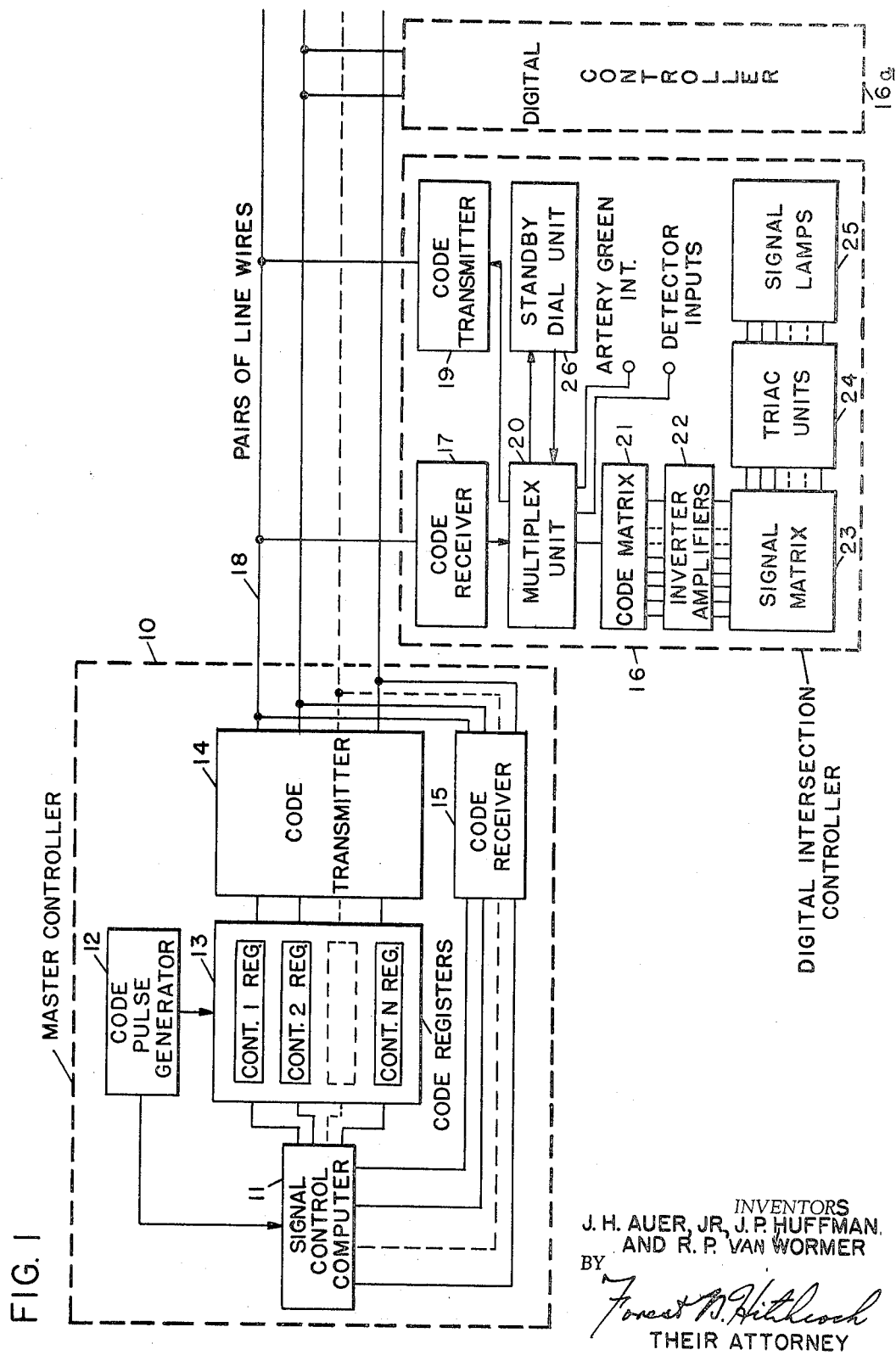
FIG. 1 is a block diagram of the system.

FIG. 1 illustrates the system of the invention in block diagram form. The master controller 10 includes a signal control computer 11, code pulse generator 12, code registers 13, code transmitter 14, and code receiver 15. Both the code transmitter 14 and code receiver 15 provide a plurality of outputs and inputs respectively, each being connected to an individual communication circuit which extends to a respective digital intersection controller such as the controller 16. It will be understood that additional digital controllers such as 16A, etc., are provided and that each has a code receiver such as receiver 17 included in controller 16 which connects to a respective communication circuit such as 18 to enable that intersection controller to receive code messages from the code transmitter 14 in the master controller 10. Each intersection controller also includes a code transmitter 19 which is connected to the same communication circuit as the associated receiver 17, thereby enabling an indication code to be transmitted from each digital controller 16, 16A, etc., to the master controller, whereby information as to traffic conditions provided by vehicle detectors and information as to the existing condition of the intersection controller can be made available to the signal control computer 11. Such indication code is received by the code receiver 15 included in master controller 10 which then supplies a coded indication signal from each individual digital intersection controller to the signal control computer 11.

The master controller 10 includes a plurality of code registers 13 each of which stores a coded message received periodically from the signal control computer 11 and representing the signal interval to which a respective one of the digital intersection controllers 16, 16A, etc., is to be operated. Each coded message is periodically updated, once each second for example, by the signal control computer 11. The code pulse generator 12, once each updating interval, causes the code then stored in each of the code registers 13 to be transferred out of the respective register and into a respective one of the plurality of inputs of the code transmitter 14, which code transmitter then transmits the code message over a respective one of the communication circuits such as 18 to a corresponding digital controller 16, 16A, etc.

The code message received at a typical digital controller such as 16 is applied by the code receiver 17 to a multiplex unit 20 whose function is to receive the message, check the message by means of a parity check, and then transfer it to a code matrix 21 when it has been determined that the entire checked message has been received. Code matrix 21 selectively controls the energization of one of a plurality of output leads in accordance with the particular binary number of the multi-bit message received from multiplex unit 20. For example, assuming that the message comprises four bits, the code matrix 21 will selectively energize one of $2^4$ or 16 output leads. This selective energization of one of the output leads of code matrix 21 controls signal matrix 23 through the inverter amplifiers 22 to selectively energize a particular combination of signal lamps through the action of triac units 24 and associated signal lamps 25.

A standby dial unit 26 is provided which is normally inoperative, provided that successive, complete, and parity-checked code messages are received by the multiplex unit 20. However, in the event that this does not occur, this condition is detected in the multiplex unit and provides a control which places the standby dial unit 26 in operation. Dial unit 26 then provides successive pulses to the multiplex unit 20, which pulses take the place of the multidigit code received normally from the code transmitter 14. In the same manner as before, the resulting code applied to the multiplex unit 20 from the dial unit 26 makes possible the selective control of the code matrix 21, thereby making possible the control of the signal lamps 25 through the signal matrix 23 and triac units 24.

TRANSMITTED CODE, FIG. 2

Figures 2, 3C:
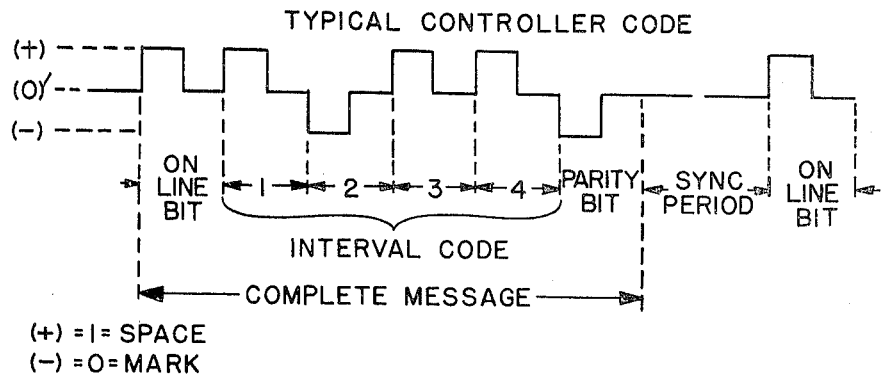
FIG. 2 represents diagrammatically the cyclical code messages which are transmitted from the master controller to each intersection controller.
FIG. 3C is a code table setting forth the codes assigned to respective intervals in the disclosed embodiment of the invention.

FIG. 2 illustrates a typical pulse code which is transmitted from the master controller to each intersection controller at periodic intervals. As shown, the code comprises a repeat cycle of six digits, with successive cycles being separated by a synchronizing period during which no distinctive code pulse is transmitted and which period is significantly longer than any individual code pulse thereby enabling the synchronizing period to be recognized as such by each intersection controller.

As indicated in FIG. 2, successive pulses may be either of positive or negative polarity, and the pulses are spaced by intervals during which no signal is transmitted. The first digit which is transmitted is an "on-line" bit, and reception of this bit at the controller location and its storage there provides an indication that the controller is operating in response to control codes received from the master controller.

After the first "on-line" bit, which is always of positive polarity and thus designated for convenience as a "one" pulse, whereby each negative pulse is considered to be a "zero" pulse, there is transmitted a series of four pulses any of which may be either a "one" or "zero" and which together comprise the interval code. Since four bits are used for the interval code, it is apparent that $2^4$ or 16 different intervals may be designated. Immediately after the interval code, a "parity" bit is employed, the polarity of which is dependent upon whether an odd or even number of positive pulses are in the first 5 digits of the code. If there is an odd number of positive pulses then the parity bit is positive and if there is an even number of positive pulses then the parity bit is minus. If it is desirable to send more information from the office to the field or from the field to the office then the message length may be increased. For example, the interval code may be increased to 5 digits permitting the selection of $2^5$ or 32 different intervals.

MULTIPLEX UNIT, FIGS. 3A AND 3B

FIGS. 3A and 3B are a block diagram of the multiplex unit 20 of FIG. 1. As shown in FIG. 3A, input terminals to the multiplex unit are connected to corresponding output terminals of the code receiver 17, and the receiver is so organized that it provides a pulse on wire 27 for each "zero" in the received code and a similar pulse on wire 28 for each "one" in the received code. The pulses on wires 27 and 28 are applied to an OR gate 29 which then provides an output pulse to both synch timer 30 and stepper driver 31 for each and every code pulse received by the intersection controller, i.e., it receives a pulse both for each "zero" and each "one" in the received code. The output pulse from OR gate 29 occurs at the end of the pulses on wires 27 and 28.

Each input pulse applied to stepper driver 31 produces an output pulse which appears on bus 32 and this bus, in turn, connects to each of the steps 1 through 7 of a stepping circuit 32a. Such stepping circuit comprises a series of seven bistable stages each comprising, for example, a silicon controlled switch which is operable from its normal or nonconductive condition to an operative or conductive condition when it receives an input pulse from bus 32 at the same time that it is receiving an enabling gate voltage from either stage immediately to the left. As in the case of step No. 1, it is rendered conductive with an output from delay 33. Thus, when any one step such as step No. 2 has been operated to its conductive condition, an output is provided therefrom to the next higher numbered step, step No. 3, over wire 33a thereby providing such next step with an enabling voltage. In this manner, the appearance of a series of stepping pulses on bus 32 causes the stepping comprising steps 1 through 7 to be advanced a step at a time, in order, through a complete cycle.

Associated with each of steps 1–5 of stepper 32a is an "AND" gate which receives one input from the corresponding step and another input from the read-in pulse circuit 34. This latter circuit 34 has an input connected to wire 28 which, as previously mentioned, receives a signal pulse for each "one" pulse occurring in the code. For each appearance of a "one" pulse, pulse circuit 34 produces an output pulse on bus 35 which connects to each of the AND gates 36–40. Since the stepper 32a in effect counts the number of code pulses in a message and sequentially provides a gating input to each of the AND gates 36–40 in turn, whereas the read-in pulse circuit 34 selectively provides a second gate to each of the AND gates 36–40 upon the occurrence of a "one" in the received code, it will be apparent that at the end of reception of a message, only selected ones of the AND gates will have had both of their inputs fulfilled and these will correspond to the pulse periods on which a "one" appeared in the received code. As mentioned previously, the code stepper 32a is advanced at the end of each line pulse. The read-in pulse circuit 34 is energized throughout the duration of a "one" on wire 28. From this it can be seen that the code stepper 32a is positioned in its proper place awaiting the arrival of a "one" on wire 28 therefore initiating an output from pulse circuit 34. For example, assuming that the "on-line" bit is present and that the third code pulse is also a "one" whereas the remainder of the code consists of all "zeroes." As will be described later, the code stepper 32a is reset to step 1 by delay 42 and delay 33 during each synch period. Therefore one input of AND gate 36 is fulfilled awaiting the arrival of the "on-line" bit. When the "on-line" bit appears on wire 28, there is an output from pulse circuit 34 on line 35 fulfilling the second input to AND gate 36 causing an input of memory M1 of code memory 42a. At the end of the "on-line" bit the code stepper 32a is advanced from step 1 to step 2 to await the second bit of information. Since the second bit of information is not a "one," there is no output from pulse circuit 34 therefore there is no output from AND gate 37 to set memory M2. At the end of the second line pulse, code stepper 32a is advanced to step 3 to await the arrival of the third bit of information. Since the third bit of information is a "one," both inputs to AND gate 38 are fulfilled causing memory M3 to be set. Since the next two line pulses are both "zeroes," memories M4 and M5 will not be set. There is no memory for bit 6 since it is a "parity" bit and not part of the interval code. Therefore, during the arrival of the coded message memories M1 and M3 will have received inputs from AND gates 36 and 38 respectively while memories M2, M4 and M5 will not have received inputs from their corresponding AND gates. Each memory step comprises a bistable device such as a silicon controlled switch which is operated in response to an input signal received from the associated AND gate 36 to 40, and, when so operated, supplies an output to an associated one of the AND gates 56, 59–62. Each memory step can be reset to its original state in response to an input received from the code clearing circuit 63a. Such a resetting signal occurs when OR gate 63b receives an input from delay circuit 42 during the synchronizing period and also occurs when memory readout circuit 46 provides an output pulse to an input of OR gate 63b.

Each of steps Nos. 2–7 receives an enabling input from the step immediately to the left, as already mentioned. Step 1, on the other hand, is set by an input from delay 33. Delay 33, in turn, receives an input from delay circuit 42, and delay circuit 42 receives an input from synch timer 30. During the time of receipt of a message comprising a successive series of pulses, either "zeroes" or "ones," the synch timer 30 is continually being reset by each successive pulse so that it does not have an opportunity to time out. However, during the synchronizing period at the end of a message, no resetting pulse is applied to the synch timer 30 for an interval which is well in excess of the period timed by the synch timer 30. As a result, when synch timer 30 does time out, a pulse is supplied to delay circuit 42 which, after a predetermined delay interval, supplies an output pulse to delay 33 and stepper driver 31. The output from delay 42 causes a long step pulse to appear on bus 32 which clears out all steps of the code stepper 32a. When delay 33 has timed out, step 1 of the code stepper is "set" and therefore in the proper condition to await the arrival of the next message.

When the code is fully placed into the code memory 42a, a check is made of the received message to indicate that it is complete and in proper form, and if these conditions are met, the message is then transferred to a code storage unit 43a comprising the storage steps S1–S5. A check of the message is accomplished by applying several inputs to an AND gate 43, which AND gate therefore will supply an output pulse over lead 44 to the storage clear-out circuit 45 and, subsequently, to the memory read-out circuit 46, only provided that all of the three inputs are concurrently present at the input of AND gate 43.

One input to AND gate 43 is provided by the output of synch timer 30. As previously mentioned, the synch timer 30 produces an output pulse only at the end of a message when it recognizes the distinctive synchronizing period. A second input to AND gate 43 is obtained from parity check circuit 47 which receives its input from wire 28 to which the "one" digits of the code are applied. Parity check circuits are well known in the art and need not be described in detail here. Briefly, such a parity check circuit may respond to all the "one" digits in the code and determine that either a desired odd or even number of such digits are present. If all the required "one" digits are present, an output is supplied from the check circuit to the AND gate 43. The third input to AND gate 43 is obtained from step No. 7 of the stepper. An output is obtained from step No. 7 only when a message having the proper number of steps has been received since only under those conditions will step No. 7 be operated from its normal condition.

Consequently, upon the reception of a message of the proper number of digits, a message satisfying the parity check circuit 47, and upon the occurrence of the synch pulse at the end of such message, an output is obtained from AND gate 43 and applied over wire 44 to the input of storage clear-out circuit 45.

Storage clear-out circuit 45 produces an output pulse on wire 48 for each input on wire 44, and this output is applied as one input to AND gate 49. A second input to this AND gate 49 is obtained from delay circuit 51 which receives an input over wire 50 from step S1 of the code storage unit 43a comprising steps S1–S5. Assuming that the previous message was one containing a "one" digit on the "on-line" bit, the S1 step of the storage unit will have been operated to its "one" condition so that delay circuit 51 will be receiving an input at this time and will therefore also be supplying an input to the lower terminal of AND gate 49. Accordingly, the appearance of a pulse on wire 48 from the storage clear-out circuit 45 will cause both inputs to AND gate 49 to be fulfilled so that an output pulse will appear on bus 52 in response to the pulse on wire 48, and this pulse on bus 52 resets each of the steps S2–S5 of the storage unit 43a, thereby erasing the code that has been stored there from the preceding message. The resetting pulse on wire 48 is also directly applied to step S1 to reset it as well. Although this removes the input signal that delay circuit 51 has been receiving from storage S1, the delay provided by delay 51 ensures that AND circuit 49 will still be receiving an input on its lower input terminal throughout the appearance of the reset pulse on wire 48, thereby enabling AND gate 49 to produce the resetting pulse on bus 52.

The storage clear-out circuit 45 also provides an output to delay circuit 54 which, in turn, provides a pulse to the input of memory read-out circuit 46. A pulse is produced in response thereto on wire 55 which connects to one input terminal of AND gate 57, and also to one input of AND gate 56. Assuming that the message now present in code memory 42a includes a "one" for the "on-line" bit, AND gate 56 will now provide a pulse to storage step S1 to operate it to the "one" condition. As a result, delay circuit 51 will then be controlled to supply a gating input to the second input of AND gate 57, thereby permitting that gate to produce a pulse on bus 58. The pulse provided by memory read-out circuit is sufficiently broad to ensure that it will continue to provide an input to AND gate 57 throughout the brief time required for AND gate 56 to operate step S1 and produce a second gating input on AND gate 57.

Depending upon the particular code message received, certain of the memory steps M2–M5 may at this time have been operated to their "one" condition so that they will be supplying an input to a respective one of the AND gates 59–62. Accordingly, upon the appearance of a pulse on bus 58, those AND gates which are associated with the memory steps M2–M5 that are then in the "one" state will then have both their inputs satisfied and will, accordingly, produce an output signal to the associated storage steps S2–S5. Such input to any storage step is sufficient to operate it from its normal "zero" state to an operated or "one" condition indicative of the presence of a "one" digit in the received code.

From the description given thus far, it is apparent that in the synchronizing period between successive messages, a message is stored in storage steps S1–S5 which corresponds to the "zero" and "one" makeup of the code received just prior to the reception of the synchronizing period, and moreover the appearance of this code in the storage steps S1–S5 occurs only provided that all the digits of the message have been received and have been checked for parity as previously described.

Each step of the storage steps S2–S5 which is in the "one" condition provides an output over an associated wire 64–67 to a respective terminal. These terminals have been designated as A–D, respectively, and are connected to corresponding terminals A'–D' shown in FIG. 4A.

When the controller is to operate in response to the dial rather than in response to code messages received from the computer 11 at the master controller 10, a message is transmitted to the controller which includes a zero rather than a one for the "on-line" bit. When this is done, memory step M1 remains in its normal or "zero" condition because of the presence of a "zero" for the first or "on-line" digit of the code. However, since the immediately preceding message included a "one" for the "on-line" bit, step S1 of the storage unit 43a will still be in its "one" state and will therefore be providing an output to delay circuit 51 so that AND gate 49 will have one input energized. Upon the occurrence of the end of the message, storage clear-out circuit 45 will produce a pulse on wire 48 which will reset the storage step S1 and will also provide a second input to AND gate 49. Delay circuit 51 provides sufficient delay time to ensure that an input to AND gate 49 will still be present upon the occurrence of the reset pulse on wire 48 even though such reset pulse is also effective to reset step S1 and thus remove the input from delay circuit 51. Therefore, AND gate 49 will now produce an output pulse on bus 52 which will reset each presently operated step S2–S5. Moreover, after a delay interval dependent upon the delay time provided by delay circuit 54, a pulse will appear on wire 55 which is applied to both AND gate 56 and AND gate 57. Under the assumed circumstances, AND gate 56 will now not be receiving a second input from the M1 memory step; therefore, storage step S1 will now not be operated. Moreover, since storage step S1 has now not been operated, delay circuit 51 will no longer provide a second input to AND gate 57; therefore, no signal will appear on bus 58 and no "ones" can be transferred to storage steps S2–S5.

With storage step S1 now in the "zero" state, indicative of the absence of a "one" for the "on-line" bit of the code, no inhibit output will be present on wire 50 extending to dial control circuit 162. Normally, when step S1 is operated, the output provided by this step acts as an inhibit input to dial control circuit 162 which then acts to maintain the motor driven dial 26 inoperative. Also, the output of step S1 inhibits both the counter pulsing circuit 163 and synch pulse circuit 164 for reasons to be set forth later. Under the presently assumed circumstances, however, dial control circuit 162 does not receive this inhibit input so that motor driven dial 26 becomes operative. The effect of the dial and its associated counter pulsing circuit 163 as well as the synch pulse circuit 164 will later be described in detail.

Associated with each steps 1–6 of code stepper 32a is an indication step I1–I6. Each of these also comprises a device which is operated from its normal or "zero" condition to an operated or "one" condition in response to the presence of an input at the lead entering the corresponding block on the drawing at the top. As shown, the indication step I1 normally receives an input and is therefore continually effective to produce a "one" digit for the first digit of the indication code. Thus, irrespective of the indication code provided on steps I2–I6, a "one" always appears in the first step so as to provide an indication at the master controller that the intersection controller is receiving the control code obtained from the master controller and is responding to such code as well as having the capability of sending an indication code back to the master controller. Step I2 receives an input, causing it to register a "one" in the indication code, whenever the controller is in a particular, designated interval. Thus, step I2 is shown as receiving an input on terminal E from the signal matrix 23 of FIG. 4B. In FIG. 4B, the corresponding terminal E is shown as being connected to the particular horizontal bus in the signal matrix 23 which is energized to cause the phase 2 green signal to be displayed. A "one" is therefore transmitted on this digit of the indication code whenever the intersection controller is in the phase 2 green interval. Of course, any other signal interval may be used for this purpose as well as the phase 2 green interval.

The remaining steps I3–I6 are each associated with a respective vehicle detector relay. Each such relay is normally energized, but is dropped away momentarily whenever a vehicle is detected by the corresponding vehicle detector. When this happens, the lead extending to the respective indication step is grounded through the closed back contact of the vehicle detector relay. Assuming, for example, that indication relay VR1 is dropped away in response to a detected vehicle, the closure of its back contact 68 results in the grounding of the wire extending to step I3.

Each of the indication storage steps I1–I6 supplies an output signal selectively to one input of a two input AND gate 69–74, respectively. The second input to each AND gate is obtained from a respective one of the steps Nos. 1–6 included in the code stepper 32a. Thus, as the code of "zeros" and "ones" is received with the result that stepping pulses appear sequentially on bus 32 to effect operation of stepper 32a from one step to the next, gating inputs are applied sequentially to the AND gate 69–74 so that each AND gate in turn will produce an output on bus 75, provided that it is then also receiving a second input from an associated one of the indication steps I1–I6. The read-out of the "ones" from the step I1–I6 is a destructive read-out as will be described in detail later so that there is no need to reset the various steps I1–I6 each cycle before inserting a new indication code.

The input signals on bus 75 are supplied to a flip-flop 76 which is set by each signal on bus 75 and reset by each stepping pulse appearing on bus 32. Where successive ones of the AND gates 69–74 are receiving both gating inputs, the flip-flop 76, for all practical purposes, stays in the set condition since even though it may be reset momentarily by a stepping pulse on bus 32, it will immediately be set again as the stepper 32a advances from one step to the next, since this will immediately result in the occurrence of a further signal on bus 75 from the next AND gate of the group of AND gates 69–74. However, if one AND gate such as AND gate 70 provides an output but the next AND gate 71 does not, then the output signal produced on bus 75 from AND gate 70 will set the flip-flop 76 and the next-occurring stepping pulse on bus 32 will reset the flip-flop, while at the same time advancing the stepper from step No. 2 to step No. 3. As a result, the flip-flop 76 will remain in the set condition only during the time that the stepper is on step No. 2 and effective to provide an output from AND gate 70.

Flip-flop 76 has its output connected to the input of transmitter 19. Transmitter 19 may include a source of alternating current energy or may receive external alternating current energy as from a commercial power source. In any event, it is organized to provide a continuous wave alternating-current signal throughout any time that it is receiving an input from flip-flop 76 while the latter is in the set condition. Throughout any pulse period that flip-flop 76 is in the normal or reset condition, no alternating current output signal is provided by transmitter 19. The resulting code which is received at the master controller 10 and applied to the signal control computer 11 from code receiver 15 is readily identifiable at the control computer 11 on a digit-for-digit basis since the master controller necessarily includes means for demarcating the successive pulse periods of the control codes, and this same means can readily be used also for demarcating the successive pulse periods of the indication code.

CODE MATRIX AND SIGNAL MATRIX, FIGS. 4A AND 4B

The code matrix 21 of FIG. 4A is shown as having a plurality of terminals A'–D' which, as previously described, connect respectively, to the terminals A–D of FIG. 3. Each of these terminals A'–D' is connected to a matrix control unit which selectively energizes either one of two output buses associated with that control unit depending upon whether energy is present or absent on the corresponding terminal. For example, assuming that a voltage is present on terminal D', energy will appear on output bus 80 associated with the No. 4 matrix control unit. On the other hand, if no energy is present on terminal D', output bus 81 instead will be energized, and bus 80 will be de-energized.

Each of the matrix control units is similar, and for this reason only the No. 4 matrix control unit has been shown in detail. Thus, when transistor Q1, which has its base conected through resistor 82 to terminal D', is normally cut off in the absence of any voltage at terminal D' its collector is substantially at the level of voltage provided by the (+) terminal, and this voltage appears on bus 81. At the same time, with bus 81 at an elevated potential, and by reason of the connection made from bus 81 through resistor 83 and diode 84 to the base of transistor Q2, transistor Q2 is conductive so that its collector potential is near that of the grounded emitter. Bus 80 is therefore at substantially ground potential under the assumed conditions.

If, on the other hand, terminal D' is elevated in potential, transistor Q1 will become conductive, thereby lowering the potential on bus 81 to substantially the level of the grounded emitter of transistor Q1. At the same time, the low potential on bus 81 will cause transistor Q2 to become cut off so that there is substantially no voltage drop across resistor 85 in the collector circuit. Because of this, bus 80 is then substantially at the voltage of the (+) source.

The code matrix comprises two horizontal buses associated with each of the terminals A'–D' and 16 vertical buses, each of which may be selectively connected to one of the horizontal buses through a resistor. FIG. 4C illustrates the symbol used to denote the connection of a horizontal bus through a resistor, to a vertical bus. For reasons which will become apparent when the details of the code storage unit 43a are presented, the presence of energy on any terminal A'–D' is representative of the occurrence of a "zero" on the corresponding code digit. Depending upon the binary combination of energized and de-energized conditions of the terminals A'–D', a selected one of the 16 vertical buses of the code matrix 21 is connected through corresponding resistors only to horizontal buses all of which are substantially at ground potential; every other one of the 16 vertical buses is connected through a resistor to at least one bus which is at a potential above ground. Thus, assuming that the binary code is such that terminals A', B', and D' are at elevated potentials and that only bus C' is at ground level, then output buses 90, 88, 87 and 81 are the only ones of the eight output buses which are at ground. It can be seen that under these circumstances the only vertical bus which is connected through matrix resistors to horizontal buses, all of which are at ground, is bus 4 since it is connected through resistor 92 to bus 90, through resistor 93 to bus 88, through resistor 94 to bus 87, and through resistor 95 to bus 81.

It will be seen that the number of the vertical bus selected corresponds to the binary equivalent of the input code applied to buses A'–D'. Thus, if buses A'–D' represent the four digits of a four bit binary code in the order 1–2–4–8 it can be seen that the decimal equivalent of the deenergization of only bus C' is 4. It will be apparent that different vertical buses are selectively grounded in accordance with different combinations of energized conditions of the terminals A'–D'.

Associated with each of the vertical buses in the code matrix is an inverter amplifier. The function of such inverter amplifier is to amplify the level of output voltage on the associated vertical bus of the code matrix and also to invert it so that an amplified output voltage is produced by that particular inverter amplifier which is connected to the vertical bus that is at ground potential whereas all other inverter amplifiers associated with the remaining vertical buses which are at an elevated potential, above ground, will produce an output of substantially zero voltage. From this, it follows that one and only one inverter amplifier, selected according to the decimal equivalent of the binary coded input applied to terminals A'–D', is at a voltage which is above ground level.

Each of the inverter amplifiers illustrated provides its output to an associated one of the vertical buses included in the signal matrix 23. This matrix includes, in addition to the 16 vertical buses, a plurality of horizontal buses, each associated with the control of a respective signal lamp. Diode connections may be made from any vertical bus to as many horizontal buses as may be desired. As shown in FIG. 4C, each diode connection is represented by a circle surrounding the intersection of a vertical and a horizontal bus. For each signal interval represented by the energization of a different one of the vertical buses in the signal matrix, any desired combination of signal lamps may be energized depending upon the diode connections made between any vertical bus and the plurality of horizontal buses. Also, it will be evident that any desired sequence of intervals is possible merely by transmitting from the master controllers to any individual intersection controller the required code representative of that interval.

Assuming that the computer code comprises all "ones" so that each of the buses A'–D' is energized in FIG. 4A, corresponding to the decimal number 0, it can then be seen from the code matrix 21 that the No. 0 bus is the only one of the sixteen vertical buses that is then at ground potential and thus the corresponding No. 0 bus in the signal matrix 23 is the only one that is at a potential above ground. By reason of the connections made by diodes between this vertical bus and the horizontal buses 97–102 through diodes 103–108, respectively, each of these buses 97–102 will be energized and, as a consequence, the DONT WALK and the Red signal lamps for each of the three phases designated in the drawing will be energized. This represents the ALL-RED interval which is now frequently employed at the end of the vehicle clearance interval for any one phase and immediately prior to the green interval for the succeeding phase.

Assuming that the signal matrix has diode connections established for a three-phase system having pedestrian signals and ALL-RED intervals between each successive pair of phases, it will now be described how the desired combinations of signal lamps are displayed in accordance with the reception of different code signals designating respectively different signal intervals.

FIG. 3C illustrates a tabulation of the different signal intervals which may be employed in a three-phase system. Startig with the ALL-RED interval, a pedestrian interval is next provided for each of the three phases, and this is followed by a flashing display of the DONT WALK signal for each of the three phases. Immediately after this, a GREEN signal is displayed for phase 1, and this is followed by a clearance or YELLOW signal for phase 1, with the ALL-RED display being provided thereafter. On each of the remaining phases, the GREEN or Proceed Indication is first displayed and then a vehicle clearance or YELLOW signal, followed by an ALL-RED interval as indicated in FIG. 3C.

As already described, the ALL-RED interval is obtainable by the transmission of successive codes of all "ones" since this results in energization of the No. 0 bus of the signal matrix 23. At the end of a suitable interval as determined by the signal control computer 11 at the master controller 10, a new code is transmitted which, according to the code table of FIG. 3C, should be the code 0111 in order to provide a WALK signal on each of the three phases. The reception of this code provides that only terminal A' will be de-energized in FIG. 4A, whereas terminals B'–D' will remain energized. The code matrix is so organized that, in response to this code, only the vertical bus No. 1 in the code matrix 21 is at ground and only bus No. 1 in the signal matrix 23 is at a potential above ground. By reason of the diode connections provided from vertical bus No. 1 in the signal matrix to selected horizontal buses, it can be seen that energy will now appear on horizontal bus 109 through diode 110, and on horizontal bus 98 through diode 111. Thus, insofar as the phase 1 signals are concerned, a WALK signal will be displayed to pedestrians whereas the vehicles will still receive a RED signal. In both phases 2 and 3, the diode connections are such that only the WALK and RED signals are energized.

The next interval is a pedestrian clearance signal represented by a flashing DONT WALK signal for each of the three phases. In order to provide a flashing signal display, some of the horizontal buses are provided with diode connections to a source of square wave energy, and such horizontal buses are then coupled through appropriate diode connections to the principal bus ordinarily providing for the steady energization of the same traffic signal. Thus the appearance of energy on the No. 2 bus provides that energy will appear on horizontal bus 114 through diode 125 to thereby permit energization of the DONT WALK signal 112 through triac 113. Horizontal bus 114 is connected through resistor 115 and diode 116 to bus 119 and is also connected through diode 117 to bus 118 which is connected in turn to a source of square wave direct current. In the absence of energy on bus 114, the square wave direct current on bus 118 does not appear on horizontal bus 119; however, when bus 114 is at a positive potential, the square wave energy on bus 118 can appear on bus 119 and provide an intermittent input to triac 113, thereby resulting in the flashing illumination of the DONT WALK signal 112. Therefore, on interval 2, when vertical bus 2 in the signal matrix is energized, the DONT WALK signal for each phase is energized with flashing energy, while the RED signal for each phase remains energized to provide a stop indication for vehicular traffic.

On interval No. 3, the four digit code transmitted comprises 0011, and this results in the energization of only bus No. 3 in the signal matrix 23. With respect to the phase 1 signals, energization of vertical bus No. 3 results in energy again being applied to bus 97 through diode 120 so that the DONT WALK signal 112 is again steadily energized. At the same time, horizontal bus 121 is now energized through diode 122 so that the GREEN signal of phase 1 is illuminated. In phase 2, horizontal bus 99 is again energized because of the connection provided from vertical bus No. 3 to horizontal bus 99 through diode 123 so that the φ2 DONT WALK signal is energized. The phase 2 RED signal is also now energized because of the energization of horizontal bus 100 through diode 124. In phase 3, the DONT WALK and RED signals are similarly steadily energized.

One can readily determine from the circuit organization of the signal control matrix 23 the manner in which the different combinations of signals shown in FIG. 3C may be energized in accordance with the reception at any controller of a predetermined binary four-digit code. In the specific example given, the transmitted code progresses in binary order, starting with the code of 1111 and progressing upwardly one digit at a time to provide for the successive intervals. However, it will be readily apparent that the signal control computer at the master controller is not limited to providing a steady progression of binary numbers and can provide any interval at any time merely by formulating the desired binary code designated for that particular desired interval. This feature of the invention is readily illustrated in FIG. 3C which shows that, in order to provide for an ALL-RED signal display after the 4th and before the 5th signal interval, i.e., between phase 1 YELLOW and phase 2 GREEN, it is only necessary for the master controller to repeat the 1111 code which was transmitted for the No. 0 interval. The receipt of this code at any controller may, provided the matrix is set up the way that it is in FIG. 4B, provide that the DONT WALK and the vehicle RED signal will be energized for each phase. After interval 8, when it is desired that an ALL-RED signal display again be provided, the master controller may again transmit a code of 1111, and this will again cause the display of the DONT WALK and RED signals for each of the phases according to the manner already described.

In order to place the controller in standby operation, the master controller transmits a code whose first or "on-line" bit comprises a zero. Considering the effect that is produced by the first such message transmitted, it must be recognized that the code transmitted immediately preceding this message had a "one" for the "on-line" bit, and this means that the storage step S1 is in the "one" condition. Therefore, as already described, the lower terminal of AND gate 49 receives an input from delay circuit 51 so that the pulse appearing on wire 48 and provided by the storage clear-out circuit 45 can reset each of the storage steps S2–S5 to the "zero" condition while at the same time resetting the S1 step directly from wire 48.

As previously described, the removal of output energy from wire 50 of the storage step S1 now removes an inhibit input to dial control circuit 162 so that dial 26 can now start to operate. Another effect of transmitting a "zero" for the "on-line" bit is that the inverter 130 does not any longer receive an input from storage step S1 over wire 50 and thus the inverter 130 will now produce a positive output voltage on its output bus 131, thereby providing one input to each of the AND gates 132–134. The function of these AND gates will shortly be described in greater detail.

Referring again to FIG. 3A, the three-second timer 189 and the associated thirteen-second timer 190 are operated in parallel in the sense that both receive an input from the output of AND gate 43. Under normal circumstances, AND gate 43 supplies an output once each cycle and, assuming that the code cycles are transmitted at one-second intervals, this means that both the timer 189 and 190 will receive an input pulse from AND gate 43 once each second. Since each input pulse to these timers has the effect of resetting the timer, neither of these timers will have an opportunity to time out under normal operating conditions.

Assuming that there is some fault in the computer or in the communication circuit such that a proper message is not received for three successive cycles, then timers 189 and 190 will not receive an input for three seconds and this will give the timer 189 an opportunity to time out and provide a pulse over wire 188 to OR gate 161. The output of OR gate 161 will reset each of the steps S2–S5 to the "one" state thereby immediately putting into effect the ALL-RED signal interval. At the end of an additional ten seconds, the thirteen-second timer 190 will time out and will supply an output over wire 191 to step S1, and this input to step S1 will operate this step to the "zero" state, thereby starting the dial 26 and placing the controller on standby operation. It can be seen therefore that the sequence of events in the event of an unexpected failure in the system is for the controller to operate first to the ALL-RED condition and to provide this indication for an interval of ten seconds before causing the controller to operate in response to the dial. The purpose of doing this is to provide as orderly a transition as possible in view of the fact that a failure may occur when the local controller is in any one of its numerous possible intervals and it is preferable not to go immediately to dial operation since this might produce a quite drastic change in signal indications. Instead, warning is given to all drivers approaching the intersection by means of the display of an ALL-RED signal interval, thereby bringing traffic to a halt for a short interval prior to starting operation of the controller in response to the programmed sequence of intervals provided by the dial unit.

DIAL UNIT, FIG. 5

Figure 5:
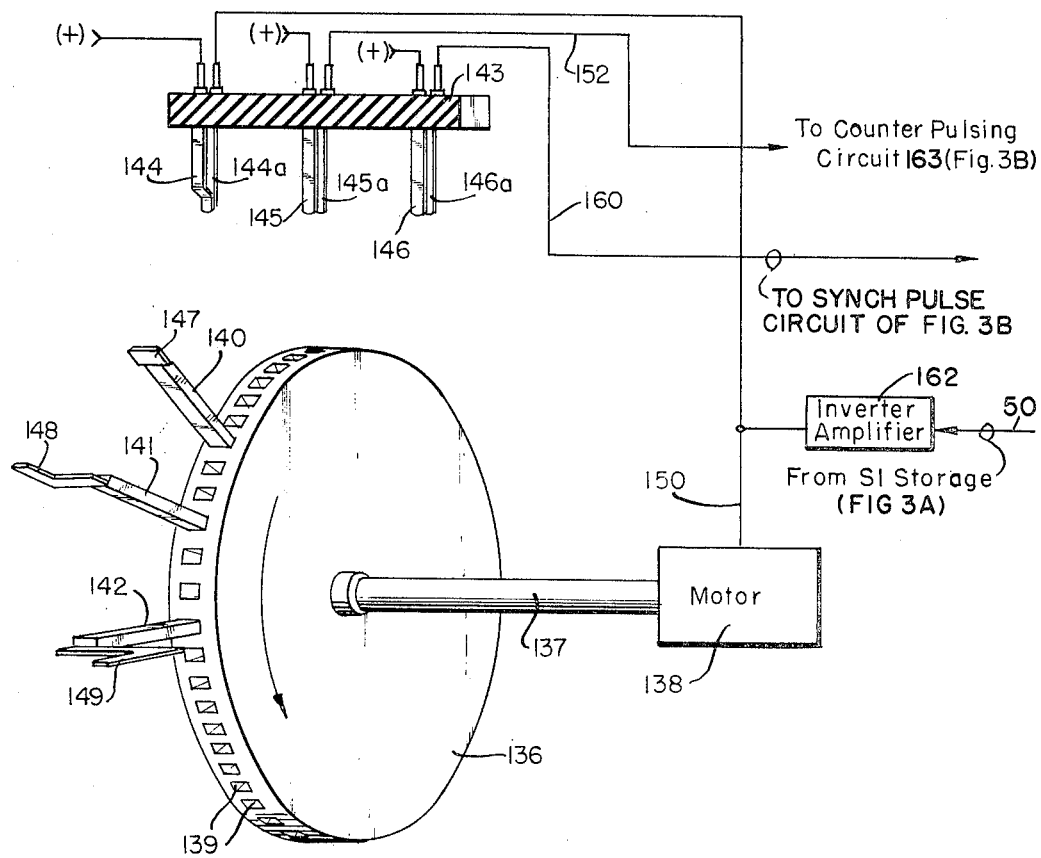
FIG. 5 is a perspective view of a typical standby dial unit.

The dial unit 26 and its associated logic is illustrated in FIG. 5 and is shown as comprising a circular dial member 136 mounted upon a shaft 137 and adapted to be rotated by motor 138. Around the circumference of the dial 136 are a plurality of apertures 139, each of which is adapted to receive a pin such as the pins 140, 141, and 142. These pins may be inserted into the drum whenever desired, and since a considerable number of the apertures 139 are provided about the circumference of the drum 136, it is possible to place one of the pins at substantially any desired angular position about the periphery of the drum. Mounted adjacent the drum and secured to an insulating block 143 are three pairs of electrical contacts, the first of which comprises a pair of normally closed contacts 144, 144a, the second comprising a pair of normally open contacts 145 and 145a and the third comprising a pair of normally open contacts 146 and 146a. It is apparent from the drawing that the pin 140, which is provided with a central tab 147 is so arranged that once each revolution of the drum 136, contact 145a is actuated to bring it into electrical connection with the associated contact 145. Also, with respect to pin 141, a tab 148 is associated therewith which, once for each revolution of drum 136, actuates contact 144 thereby momentarily opening the normally closed contacts 144, 144a. In a similar manner, the pin 142 has a projecting tab 149 which momentarily closes the normally open contacts 146, 146a once each revolution of drum 136.

Motor 138 is controlled by the selective energization of an input lead 150 which is energized either from an inverter amplifier 162, which receives an input from the S1 storage step of FIG. 3A, or from energy applied to bus 150 through contacts 144, 144a which normally provide a closed circuit to the terminal (+). As already described, the S1 storage step provides an inhibit input to amplifier 162 so that no output energy is applied to motor 138 from amplifier 162 as long as storage step S1 is in its operated condition representative of the appearance of a "one" for the "on-line" bit of the code. Energy is nevertheless applied to wire 150 through contacts 144, 144a until the dial 136 revolves to the position wherein tab 148 opens contacts 144, 144a. When this happens, motor 138 is de-energized in the absence of any output from amplifier 162 so that dial 136 will then remain at rest in the condition wherein tab 148 holds contacts 144, 144a open.

Upon the transmission of a "zero" for the "on-line" bit, resulting in the removal of energy to the input of inverter amplifier 162, output energy will be provided by this amplifier 162 over wire 150 and motor 138 thereby causing the dial 136 to start rotation. Once rotation has begun, contacts 144, 144a are closed so that it is assured that at least one revolution of the dial will take place. At the end of that revolution, the rotation will stop as described previously except that if the storage step S1 is still in its "zero" state, energy will still be applied from the output of amplifier 162 so that operation of the dial 136 continues. Thus, it can be seen that dial 136 would rotate continually as long as a "zero" appears in the "on-line" bit of the code, but that if a "one" is instead transmitted for the "on-line" bit, the drum will stop rotating, but only when it has returned to its rest position in which the contacts 144 and 144a are opened by tab 148.

Each pin 140 momentarily closes contacts 145, 145a for each revolution of drum 136, and this action results in the application of an intermittent pulse of energy from terminal (+) and over wire 152 to the counter pulsing circuit 163. Referring now briefly again to FIG. 3B, it can be seen that counter pulsing circuit provides its output over wire 153 to an input of the S2 storage step of FIG. 3A. The S2 storage step, comprising a bistable state element, is operated to its opposite condition each time that it receives an input pulse over wire 153. Each time that it is operated to its "zero" condition, the S2 storage step provides an input over lead 64 to an input terminal of AND gate 132. Thus, this input to AND gate 132 is provided for each alternate operation of storage step S2. From the description given previously, it will be remembered that steady energy now appears on bus 131 since inverter 130 is now not receiving an input over wire 50 from storage step S1. Accordingly, upon each occurrence of a signal from storage step S2 on wire 64, AND gate 132 provides an input signal over wire 155 to storage step S3 to operate it to the opposite condition. Storage steps S2 and S3 thus operate as successive steps of a binary counter since storage step S3 will now operate once for each second operation of storage step S2.

In a similar manner, each alternate operation of storage step S3 provides an input over wire 65 to AND gate 133 which is now continually receiving a second enabling input over bus 131 from inverter 130. Accordingly, AND gate 133 produces a pulse on wire 157 which is applied to storage step S4 for each alternate operation of storage step S3.

Therefore, under the condition when the "on-line" bit is a "zero" so that the storage step S1 is in its "zero" state, the remaining storage steps S2–S5 operate as a binary counter, effectively counting the output pulses which are provided by counter pulsing circuit 163. It will thus be apparent that each momentary closure of contacts 145 and 145a of FIG. 5 will advance the binary counter one step. By providing a plurality of pins 140 (FIG. 5) having central tabs 147 each adapted to actuate normally open contacts 145, 145a, the binary counter comprising steps S2–S5 can be advanced one count for each momentary closure of contacts 145, 145a. Suitable location of these pins about the circumference of dial 136 will therefore produce a predetermined timing of the duration of each signal interval since each actuation of the contacts 145, 145a, in advancing the binary counter one further step, will advance the controller from one interval to the next.

When the storage steps S2–S5 operate as a binary counter, operation must necessarily be cyclical in that the counter will, under normal circumstances, be returned to the "all-zero" state only after having received a number of input pulses corresponding to $2^n$ where $n$ represents the number of counter stages. On the other hand, the table of FIG. 3C indicates that only a portion of the counting capacity of the counter may be utilized to demarcate the several signal intervals on respective counts of the counter. Also, it may be desirable on standby operation to use less than all the signal intervals which are provided for "on-line" operation. For this reason, it is necessary that the dial, when on standby operation, restore the counter to the "all-zero" state after the desired number of input pulses have been provided to the counter as required in order to demarcate the desired number of signal intervals. This may be accomplished by providing an additional pin 142 in the periphery of dial 136 having a tab 149 which contacts the normally open contact members 146, 146a, thereby closing these contacts momentarily to provide a pulse from the terminal (+) through these momentarily closed contacts and over wire 160 and through synch pulse circuit 67 (see FIG. 3B) to one input of OR gate 161 (see FIG. 3A). The resulting output pulse of OR gate 161 is applied to each of the storage steps S2–S5 thereby resetting each of these to the "one" condition, thereby resulting in the display of the ALL-RED signal interval. The pin 142 may be so disposed about the periphery of dial 136 that it will engage the contacts 146, 146a, just prior to the time that tab 148 on pin 141 opens normally closed contact 144, 144a. This operates each of steps S2–S5 to the "one" state and ensures that the dial 136 when it is eventually stopped in order to revert to "on-line" operation, will rest in a condition corresponding to the ALL-RED interval. As previously explained, "off-line" operation is initiated by operation of the intersection controller to the ALL-RED interval. When the transition is an orderly one, purposely put into effect by the master controller, the transition is preferably made at a time when the intersection controller is already in the ALL-RED interval since this provides the least disruption in the signal cycle. When the transition to "off-line" operation is inadvertent, resulting from a line failure or the like, the transition may occur at any time in the signal cycle, but in any event the controller is then forcibly set to the ALL-RED interval, as already described. In any event, the advent of "off-line" operation is always associated with the ALL-RED interval, and it is for this reason desirable that the dial 136 be at rest in a position corresponding to that same interval so that the dial and the binary counter formed by steps S2–S5 will operate in phase when they start their conjoint operation.

Restoration of any intersection controller to "on-line" operation in response to the transmission of a "one" on the "on-line" code bit should take place only provided that the master controller "knows" which particular interval is then being demarcated in response to dial operation. This is desirable in order that reversion to "on-line" operation shall take place without any abrupt discontinuity in the signal cycle. The master controller, of course, "knows" which interval is being demarcated at some instant by an intersection controller because one of the indication pulses it receives from each intersection controller provides this information; thus, FIG. 3B shows that the second indication pulse, occurring on step I2, may be a "one" to indicate that the controller is in the green interval for a particular phase. It is, therefore, practical for the master controller to cause any intersection controller to revert to "on-line" operation during the green interval of the designated phase. If this is done (by transmitting a "one" for the "on-line" bit), and remembering that the dial 136 will continue to rotate until it reaches the desired at-rest position, it is obvious that pulses intended to operate code storage unit 43a as a binary counter may well continue to occur after the intersection controller is again in "on-line" operation. Although the operation of steps S3–S5 is prevented at such time by the absence of an output from inverter 130, step S2 can still be operated by such pulses. To prevent this, the output of step S1, provided only during "on-line" operation, is applied not only to dial unit 26 to inhibit its operation, but is also applied to counter pulsing circuit 163 and to synch pulse circuit 164 to inhibit the operation of both. Consequently, continued rotation of dial 136 occurring after reception of a "one" for the "on-line" bit, cannot cause undesired operation of code storage unit 43a.

DETAILED CIRCUIT OF CODE STORAGE UNIT, FIG. 6

Figure 6:
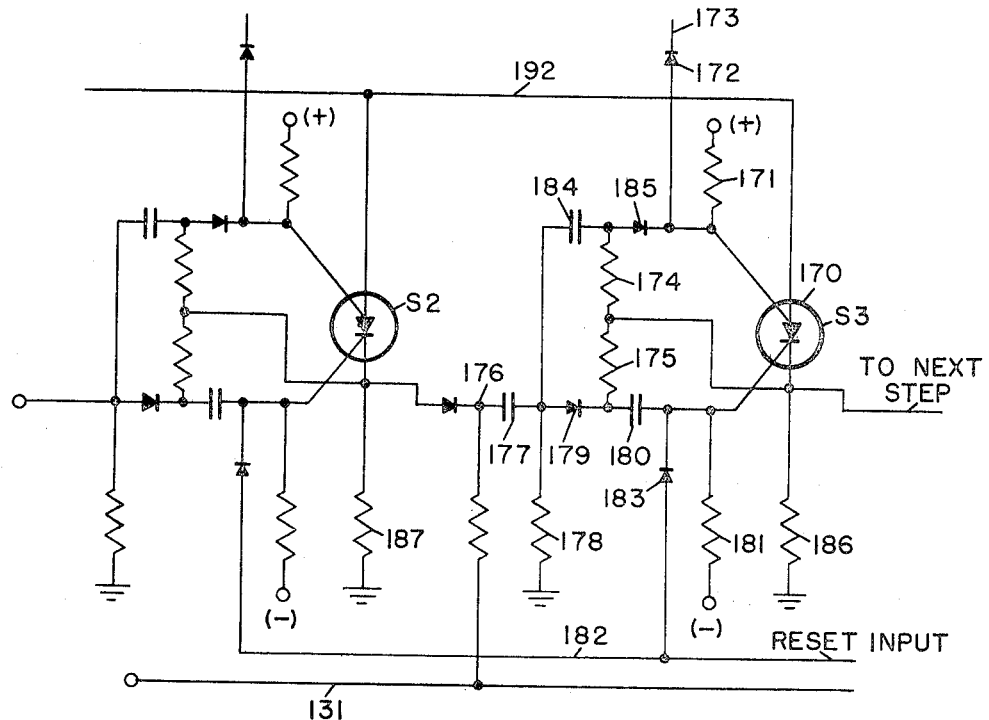
FIG. 6 is a circuit diagram of a storage-counter unit employed in the multiplex converter.

FIG. 6 is a circuit diagram of two typical stages of the code storage unit 43a comprising the steps S2–S5 and particularly illustrates their operation as a binary counter. Thus, considering first the stage comprising silicon controlled switch 170, this device has its anode connected to a bus 192, and the anode of each of the other stages is also connected to this same bus 192. The anode gate is connected through a resistor 171 to a source of positive voltage and is also connected through diode 172 to wire 173 which is connected to the output of AND gate 60 of FIG. 3A so that a negative voltage appears on this wire 173 only when AND gate 60 of FIG. 3 is operated. The cathode is connected to the junction of resistors 174 and 175. The input terminal to the stage may be considered as being at terminal 176. From this point, an input signal is coupled to the stage through capacitor 177 whose right-hand terminal is connected to ground through resistor 178. The right-hand terminal of capacitor 177 is also connected through a diode 179 to the lower terminal of resistor 175 and through capacitor 180 to the cathode gate. The cathode gate is connected through resistor 181 to a source of negative potential and through diode 183 to the reset input bus 182. The right-hand terminal of capacitor 177 is also connected through a capacitor 184 to the upper terminal of resistor 174. The upper terminal of this same resistor is connected through a diode 185 to the anode gate. The output of the silicon controlled switch 170 is obtained across cathode resistor 186.

In operation, the appearance of a positive going voltage at terminal 176 is differentiated by the R-C combination of capacitor 177 and resistor 178 so that a positive going voltage spike will appear at the junction of these circuit elements. Assuming that the silicon controlled switch 170 is nonconductive, the cathode will be at substantially zero potential; therefore, the voltage at the junction of resistors 174 and 175 will also be at zero potential. The right-hand or cathode terminal of diode 185 is substantially above ground because of the connection through resistor 171 to the (+) terminal. Therefore, the positive pulse appearing at the right-hand terminal of capacitor 184 cannot render the diode 185 conductive so that no voltage pulse will now appear at the anode gate. With respect to the cathode gate circuit, the right-hand or cathode terminal of diode 179 is now substantially at ground potential because of the connection through resistor 175 to the cathode of the SCS 170. Because of this, the positive going voltage pulse at the upper terminal of resistor 178 will readily render diode 179 conductive, thereby causing a positive voltage pulse to be applied to capacitor 180 to the cathode gate of SCS 170 to turn this device "on" or conductive. Once it is conductive, the voltage at the upper terminal of resistor 174 is substantially elevated because of the voltage drop across cathode resistor 186. Therefore, the occurrence of a positive going voltage pulse at the upper terminal of resistor 178 at this will readily render the diode 185 conductive and cause a voltage pulse to appear at the anode gate, thereby rendering the device nonconductive since this voltage pulse will raise the potential of the anode gate above that of the anode.

It will be noted from the preceding description that each stage is operated in response to a positive going voltage pulse obtained from the preceding stage. Since the output pulse from each stage is obtained across a cathode resistor, it is evident that each stage operates the next stage to its opposite condition only when it is turned "on" or to a conductive state. For this reason, the normal condition of each of the stages of the binary counter is the "on" state, and it is accordingly the normal mode of operation for the first stage to be operated to the "off" condition in response to a first input pulse, and then to be operated back to the "on" condition in response to the next input pulse, with this action resulting in operation of the second stage to the "off" state as the first stage is restored to the "on" state and supplies a voltage pulse by reason of the conduction of current through its cathode resistor.

It has previously been described in connection with FIG. 3A that a reset input may be applied to operate the counter to the "all-one" condition, and this is accomplished by applying a positive voltage pulse on bus 182 which is applied directly through a coupling diode to the cathode gate of each SCS, thereby turning it on. For example, the positive voltage pulse appearing on bus 182 is applied to diode 183 directly to the cathode gate of SCS 170 to operate it to the ON condition.

It was also described in connection with FIG. 3A that the successive stages S2–S5 would operate as a binary counter only in the absence of an inhibit input from the dial unit. This is illustrated in FIG. 6 by the bus 131 to which a positive voltage is applied when it is desired that the successive stages not operate as a binary counter but instead operate as a stepper. Thus, assuming that a positive voltage does appear on bus 131, it will be apparent that capacitor 177 will be fully charged through resistor 178 and that the appearance of a positive-going voltage at the upper terminal of cathode resistor 187 cannot further charge capacitor 177 so that no positive going voltage pulse will appear at the junction of capacitor 177 and resistor 178. Conversely, in the absence of such an inhibit input on bus 131, capacitor 177 will not be continually charged but will be charged only when a positive going voltage does appear at the upper terminal of cathode resistor 187, and this positive going voltage signal will produce a charging of capacitor 177 so that a positive-going voltage variation will appear at the junction of capacitor 177 and resistor 178. The resulting positive pulse operates the device 170 to its opposite state.

OPERATION OF INDICATION STORAGE STEPS I1–I6, FIG. 7

Figure 7:
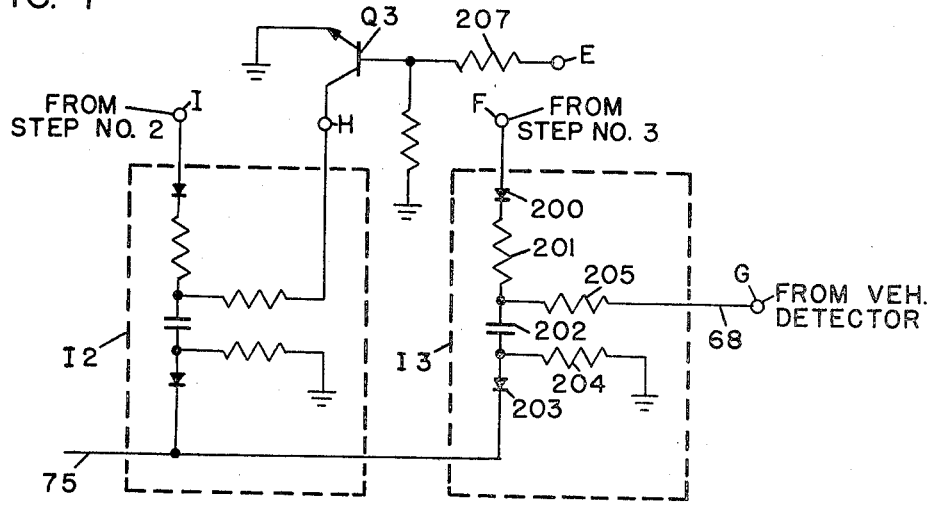
FIG. 7 is a circuit diagram of a portion of the indication code transmitting system.

Two of the indication storage steps I2 and I3 are shown in detail in FIG. 7. Step No. 3, for example, comprises in series between terminal F and bus 75 a diode 200, resistor 201, capacitor 202, and diode 203. Resistor 204 is connected between the junction of capacitor 202 and diode 203, to ground. Terminal F receives a positive voltage only when step No. 3 of the code stepper 32a is operated, and bus 75 connects to flip-flop 76 as shown in FIG. 3B. A control input is applied by selectively grounding the junction of resistor 201 and capacitor 202; if terminal G is grounded, a positive potential will appear on bus 75 in response to the presence of a positive potential at terminal F.

Assuming that terminal G is at ground, capacitor 202 will be fully discharged through resistors 205 and 204 to ground. The appearance of a positive voltage on terminal F can then charge capacitor 202 through diodes 200 and 203 to place a positive voltage on bus 75. If terminal G is not grounded, the first occurrence of a positive pulse on terminal F will charge capacitor 202 and produce a pulse on bus 75. Capacitor 202 now cannot discharge, however, so that the next occurrence of a positive pulse on terminal F will find this capacitor still charged, and no pulse can then appear on bus 75. Even a momentary grounding of terminal G, as by a momentary actuation of an associated vehicle detector, will discharge capacitor 202 and permit the transmission of a "one" pulse the next time that terminal F goes positive.

Figure 8:
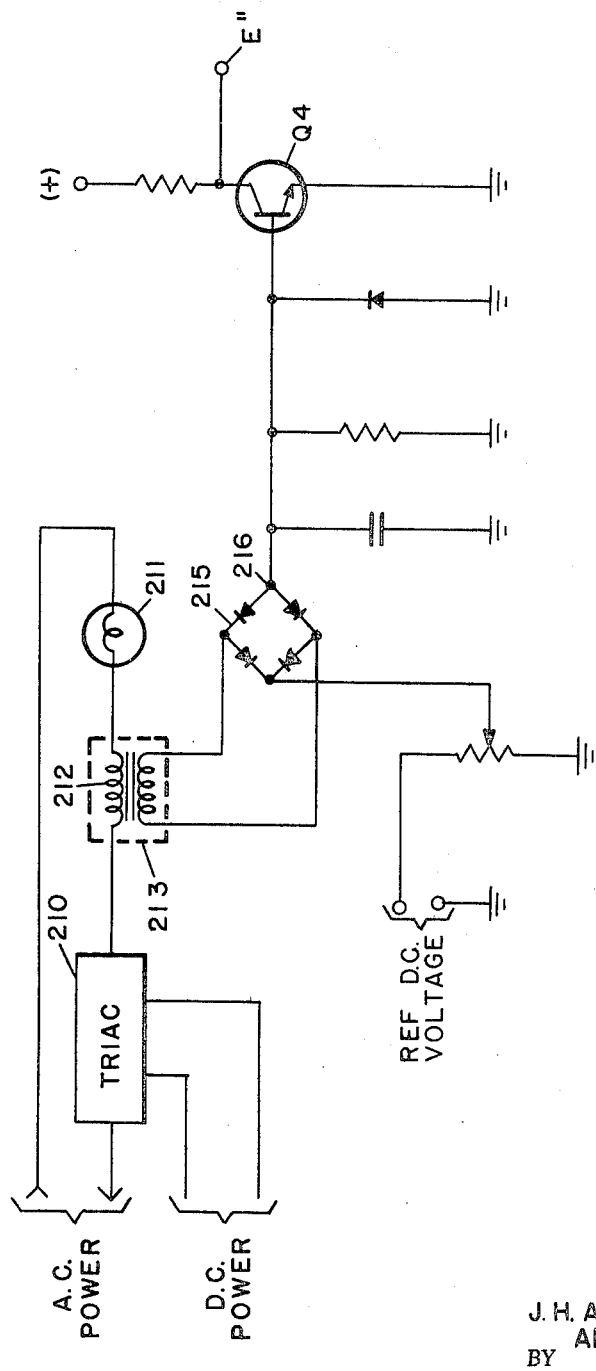
FIG. 8 is a diagram of a circuit providing for the transmission of an indication code pulse dependent upon the magnitude of current flowing to a particular signal lamp.

As to indication step I2, the selective grounding of the input terminal H is controlled by transistor Q3 whose base is connected through resistor 207 to terminal E which, in turn, is connected to terminal E' of FIG. 4B or, alternatively, to terminal E" of FIG. 8. When terminal E of FIG. 7 is raised in potential, transistor Q3 becomes conductive, and its collector potential goes substantially to ground since this is the potential of its emitter. As a result, a positive potential at terminal I produces a positive voltage pulse on bus 75. When terminal E is not grounded, transistor Q3 becomes nonconductive, and no pulse can then appear on bus 75 for step No. 2.

SIGNAL LAMP MONITOR SIGNAL, FIG. 8

I2 of FIG. 7 illustrates a circuit for controlling the transmission of an indication code pulse in dependence upon the presence of voltage at the input of a triac controlling the energization of a particular signal lamp. Although such an arrangement makes it possible for the master controller to "know" when each intersection controller is in a preselected signal interval, there is no assurance that the intended signal indication is being displayed because the signal lamp, for example, may itself be burned out.

The circuit of FIG. 8 illustrates an alternative arrangement in which the indication pulse is dependent upon the level of current flowing in the lamp circuit. Thus, triac 210 has an A.C. power circuit in which current flows in response to the selective application of D.C. energy to a D.C. signal circuit, and the A.C. circuit not only includes the lamp filament 211 but also the primary winding 212 of a current transformer 213. The secondary winding 214 is connected to opposite terminals of a full-wave rectifier 215 whose remaining terminals 216 and 217 are connected, respectively, to a transistor circuit and to a source of D.C. reference voltage. The level of reference potential applied to terminal 217 is adjusted to a suitable level such that at least the normal level of lamp current must flow in primary winding 212 for the terminal 216 to become sufficiently negative to cut off transistor Q4 and permit its collector output voltage to rise substantially to the level of the (+) terminal. When the lamp current is below this value, transistor Q4 becomes conductive, and its collector output voltage drops to near ground level.

From the description given previously in connection with FIG. 7, it will be apparent how the bilevel output of transistor Q4 may be used to control the selective transmission of a "one" or "zero" on a selected indication code pulse period.

Having described a system for the control of signals by means of a digital computer, it is to be understood that various modifications and alterations may be made to this specific form without departing in any manner from the spirit or scope of this invention.

What is claimed is:

1. A system for controlling the signal indications displayed by traffic signals at an intersection comprising:
a master controller and an intersection controller operatively connected via a line communication circuit; said intersection controller including, vehicle-responsive means, means responsive to said vehicle-responsive means for transmitting digital indication code messages to said master controller indicative of the detection of a vehicle by said vehicle-responsive means, storage means for storing the latest received code from said master controller, control means responsive to the reception of a complete message for removing from said storage means the message stored therein and substituting therefore the latest received message, standby apparatus effective when placed into operation to place successive, different codes into said storage means at predetermined intervals, means responsive to said storage means for at times rendering said standby apparatus operable, and means responsive to the repeated reception of complete code messages by said intersection controller for maintaining said standby apparatus inoperable; and
means responsive to said code messages stored in said storage means for selectively controlling the display of a predetermined combination of signal lamps.

2. The system of claim 1 in which said means responsive to said code includes, a code storage means for storing said multi-digit code, a signal control matrix comprising a first and a second plurality of buses, means operatively coupled between said code storage means and said matrix for energizing one of said first plurality of buses in accordance with the make-up of the code stored in said code storage means, and means operatively connecting each of selected ones of said first plurality of buses with selected ones of said second plurality of buses, each of said second plurality of buses when energized controlling the illumination of a respective signal lamp.

3. The system of claim 1 in which said indication code transmitting means includes a plurality of terminals which are sequentially energized in response to the reception of successive of said digits in said multi-digit code and further includes, associated with each said terminal a storage capacitor and means responsive to the charging of said capacitor as a result of the energization of the associated terminal for transmitting a distinctive code pulse to said master controller and means for selectively providing a discharge circuit for said capacitor to provide thereby selective control for the transmission of said distinctive code pulse to said master controller.

4. The system of clam 1 in which the means for rendering said standby apparatus operable renders said standby means operable upon non-reception of any said code messages from said master controller for a predetermined interval.

5. The system of claim 1 in which said intersection controller includes counting means; and said standby apparatus includes means for applying count pulses to said counting means at successive time intervals corresponding in duration to successive signal intervals, and means responsive to each of successive of counts in said counting means for controlling the display of respectively different combinations of signal indications.

6. The system of claim 5 in which said coded digital message comprises a plurality of binary digits, and said code storage means comprises a plurality or binary stages, one for each of said binary digits, and means responsive to said means for rendering the standby apparatus operable for interconnecting successive of said stages and controlling each successive stage to operate to its opposite state in response to each second operation of the immediately preceding stage, said count applying means applying said counts to first of said interconnected stages.

7. The system of claim 1 in which said intersection controller includes means responsive to the reception of each of a plurality of said digits of said multiple digit code for transmitting digital indication code messages to said master controller.

References Cited

UNITED STATES PATENTS

| | | | |
|---|---|---|---|
| 3,079,587 | 2/1963 | Barker | 340—35 |
| 3,090,032 | 5/1963 | Shand | 340—35 |
| 3,119,093 | 1/1964 | Willyard | 340—40 |
| 3,302,170 | 1/1967 | Jensen | 340—40 |

THOMAS B. HABECKER, Primary Examiner

U.S. Cl. X.R.

307—157; 340—166